United States Patent [19]
Maierhofer et al.

[11] Patent Number: 5,191,686
[45] Date of Patent: Mar. 9, 1993

[54] APPARATUS FOR PROTECTING STRETCHING ROLLERS IN SYNTHETIC FILM STRETCHERS

[75] Inventors: Hans-Juergen Maierhofer, Lindau; Willi Eberle, Wangen; Adolf Mueller, Weissensberg, all of Fed. Rep. of Germany

[73] Assignee: Lindauer Dornier GmbH, Lindau, Fed. Rep. of Germany

[21] Appl. No.: 654,832

[22] Filed: Feb. 13, 1991

[30] Foreign Application Priority Data

Feb. 15, 1990 [DE] Fed. Rep. of Germany ....... 4004696

[51] Int. Cl.$^5$ .............................................. D06C 3/06
[52] U.S. Cl. ........................................ 26/71; 26/51; 26/74; 26/78; 19/0.25; 19/268
[58] Field of Search ............... 26/71, 72, 74, 77, 78, 26/87, 99, 100, 51, 57.4; 19/0.24, 245, 262, 264, 265, 268, 0.25; 226/10, 11, 45

[56] References Cited

U.S. PATENT DOCUMENTS

| | | |
|---|---|---|
| 639,492 | 12/1899 | Ashworth ........................... 26/77 |
| 943,944 | 12/1909 | Leach .................................. 19/262 |
| 1,014,042 | 1/1912 | Brady .................................. 19/262 |
| 1,668,555 | 5/1928 | Freeburg ............................ 26/74 |
| 2,000,660 | 5/1935 | Casablancas ...................... 19/264 |
| 2,450,738 | 10/1948 | Russell ............................... 19/265 |
| 2,476,070 | 7/1949 | Solliday ............................. 26/77 |
| 2,707,309 | 5/1955 | Wilson ............................... 19/264 |
| 2,800,686 | 7/1957 | Long et al. ......................... 19/0.24 |
| 2,871,519 | 2/1959 | Flint et al. ......................... 19/0.24 |
| 3,765,616 | 10/1973 | Hutzenlaub et al. ............. 26/99 |
| 3,854,646 | 12/1974 | Dortel et al. ...................... 26/100 |
| 3,936,915 | 2/1976 | Becker ............................... 26/76 |

FOREIGN PATENT DOCUMENTS 463402 7/1935 United Kingdom ................ 19/0.24

Primary Examiner—Clifford D. Crowder
Assistant Examiner—Amy Brooke Vanatta
Attorney, Agent, or Firm—W. G. Fasse

[57] ABSTRACT

Lengthwise stretching machines for thermoplastic synthetic films are equipped with mechanical or opto-electrical devices for detecting a tearing of the film or an accumulation of film on the stretching rollers and for stopping the machine when tearing or accumulation occurs, to protect the stretching rollers. Unallowable loads and possible damage to the roller bearings are avoided by mounting the bearing housings (1, 2) of each roller (3, 4, 5) of a lower roller (7) in the machine frame for cooperation with a force generating device (8) which presses the respective bearing housing (1, 2) toward oppositely located rollers (9, 10, 11) of an upper roller group (12) to an extent permitted by stops (14, 15) rigidly arranged on the machine frame (13). The rollers (3, 4, 5) of the lower group received in the bearing housing (1, 2) can overcome the pressing force of the device (8) to slide in a yielding direction away from the upper rollers, when a roller accumulates film thereon. The rollers should move in the yielding direction so that roller axes remain in parallel to each other. The yielding movement activates a respective mechanically operable electrical limit switch of a plurality of such switches (16, 17).

7 Claims, 2 Drawing Sheets

APPARATUS FOR PROTECTING STRETCHING ROLLERS IN SYNTHETIC FILM STRETCHERS

FIELD OF THE INVENTION

The invention relates to an apparatus for protecting the stretching rollers of a lengthwise stretching apparatus, whereby the film web is guided through a roller train comprising two groups of counter-rotating rollers having parallel axes so that the film web partly loops around these rollers, and wherein the rollers of the one group are arranged in alignment with gaps between and are vertically adjustable relative to the rollers of the other group. The nonadjustable rollers of the other group are mounted in the machine frame.

BACKGROUND INFORMATION

In known stretching machines two groups of rollers are provided which are all arranged so that their axes extend in parallel to one another. The two roller groups are customarily arranged at a varying relative vertical spacing and staggered relative to one another. The synthetic film web to be stretched is guided through the roller groups in such a manner that it alternately loops around a portion of the circumference of one roller of one group and of the other group, whereby, each roller is directly driven by means of a separate drive. As a result, the rotational speed of each roller can be selected in a stepless or continuous manner between a minimum value and a maximum value. The lengthwise stretching of the material web takes place between two respective rollers in a stretching gap during operation. In machines for stretching polypropylene and polyester which incorporate the most recent state of the art, the stretching of material is achieved selectively in one or two stretching gaps. For this purpose such lengthwise stretching machines are equipped, for example, with two groups of respectively three stretching rollers each. During the stretching operation, it repeatedly occurs, partly due to varying material qualities, that the film tears. In that event, the film end remaining in the machine becomes rolled up on one of the rollers without an interruption of the roller rotation. In that event a material accumulation occurs, due to the rolling up process, whereby the outer diameter of the affected roller is enlarged. This diameter enlargement then leads to a contacting of the roller pair located directly above or below and, as a consequence, leads to the breaking of the roller shaft ends, damages of the roller bearings, and of the stretching roller itself.

To avoid these shortcomings, suggestions have already been made to use opto-electrical devices for recognizing film tearing and the following undesired wrapping up of the film onto one of the stretching rollers. However, these suggestions have the disadvantage that they lose their functional effectiveness over the course of their operating time due to fouling, or must undergo a substantially constant maintenance to assure the functional effectiveness.

Mechanical means are also known for detecting material accumulations on a roller, such as, for example, in the form of a sliding contact which is constantly in touching contact with the surface of the roller and in the case of a diameter enlargement due to wrapping up of the film, it operates an electrical limit switch which then stops the machine. It is disadvantageous that the wiper contacts constantly are touching the surface of the roller because such constant contact damages the roller surface.

OBJECT OF THE INVENTION

Therefore, it is an the object of the to an apparatus for protecting stretching rollers, which counteracts and prevents the impermissible loading and possible, damaging of the stretching roller bearing housing. Damages to the stretching rollers themselves are also to be prevented.

SUMMARY OF THE INVENTION

According to the invention those objects have been achieved in that the bearing housings of each roller of the lower roller group is directly or indirectly operatively connected with force generating means which press the bearing housings and the respective roller in the direction toward the oppositely located rollers of the upper roller group against stops which are rigidly secured to the machine frame, and wherein one of the rollers supported in the bearing housings is shiftable together with the associated bearing housing in a direction opposite to the pressing direction, thereby overcoming the pressing force, axially parallel to the neighboring rollers and in the direction toward the force generating means against mechanically operable electrical limit switches. The force generating means used are, for example, coil springs and/or hydraulically driven devices.

In the case where coil springs are used, a coil spring is arranged in a space formed between a first and a second guide plate. One end face of the coil spring facing away from the roller is supported on a bearing plate connected to the guide plates. The other end face of the coil spring contacts one end of a bearing slider vertically and slideably arranged between the guide plates. The other end of the bearing slider is rigidly connected with the bearing housing. In order to generate the shut-off signal for the machine drive, a bail arm carrying a switching pin, is attached to one of the components which is vertically slideable in the direction of the coil spring. For example, the switching pin is attached to the bearing slider, while a limit switch is arranged on a stationary component for cooperation with the switching pin. The limit switch is arranged, for example, on one of the outer guide plates. The advantages achieved by the invention essentially are seen in that the stretching rollers of a lengthwise stretching apparatus are now protected against damages. Especially the roller shaft ends and the roller bearings are protected against impermissible loading and thus against breakage, whereby a resultant down time of the apparatus is minimized.

BRIEF DESCRIPTION OF THE DRAWINGS

The invention will now be described in more detail in the following with reference to an example embodiment, wherein.

DETAILED DESCRIPTION OF PREFERRED EXAMPLE EMBODIMENTS AND OF THE BEST MODE OF THE INVENTION

Figure 1:
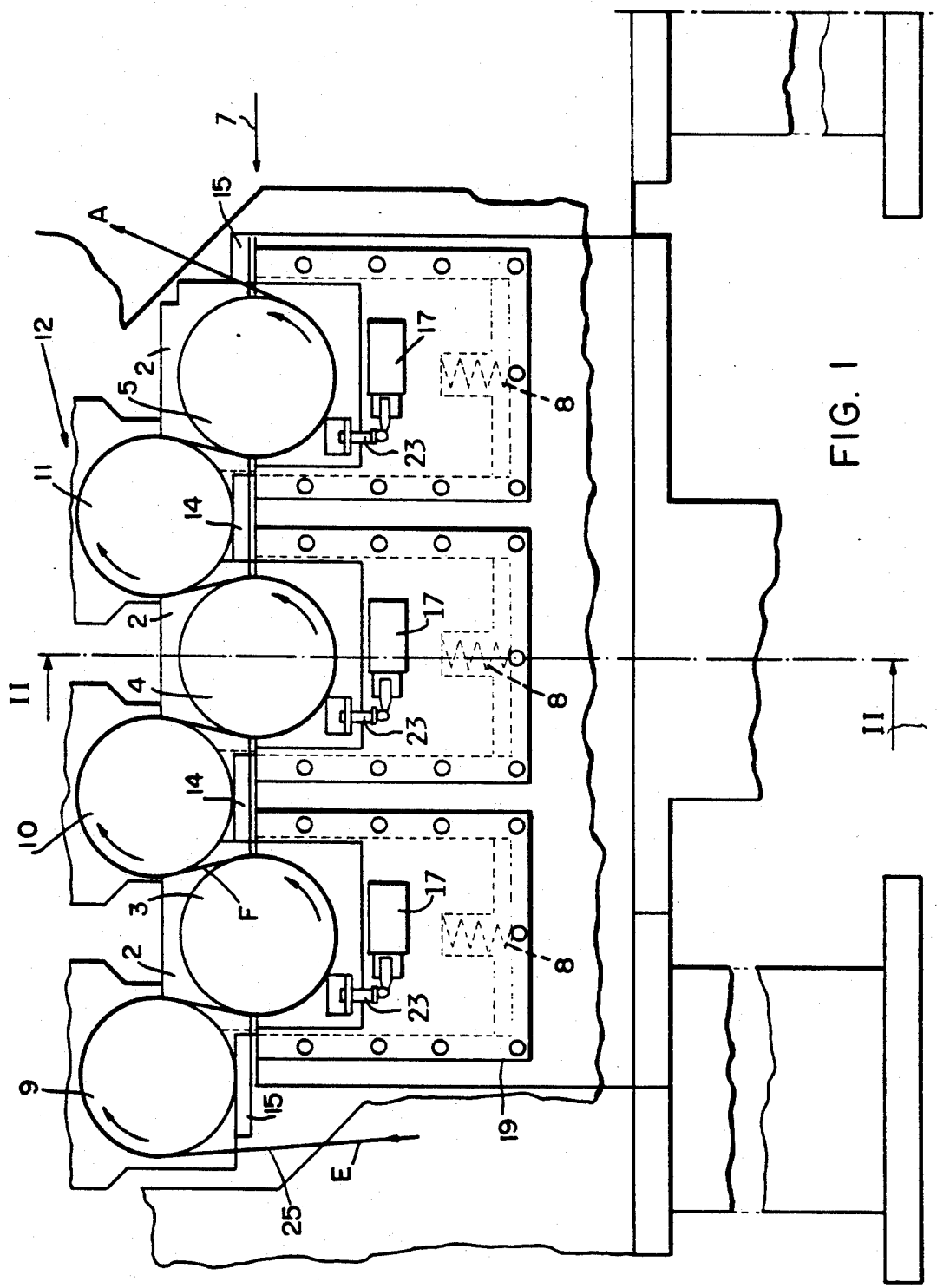
FIG. 1 shows a simplified front view of the present stretching apparatus with a film web assumed to be torn in an area "F"
Figure 2:
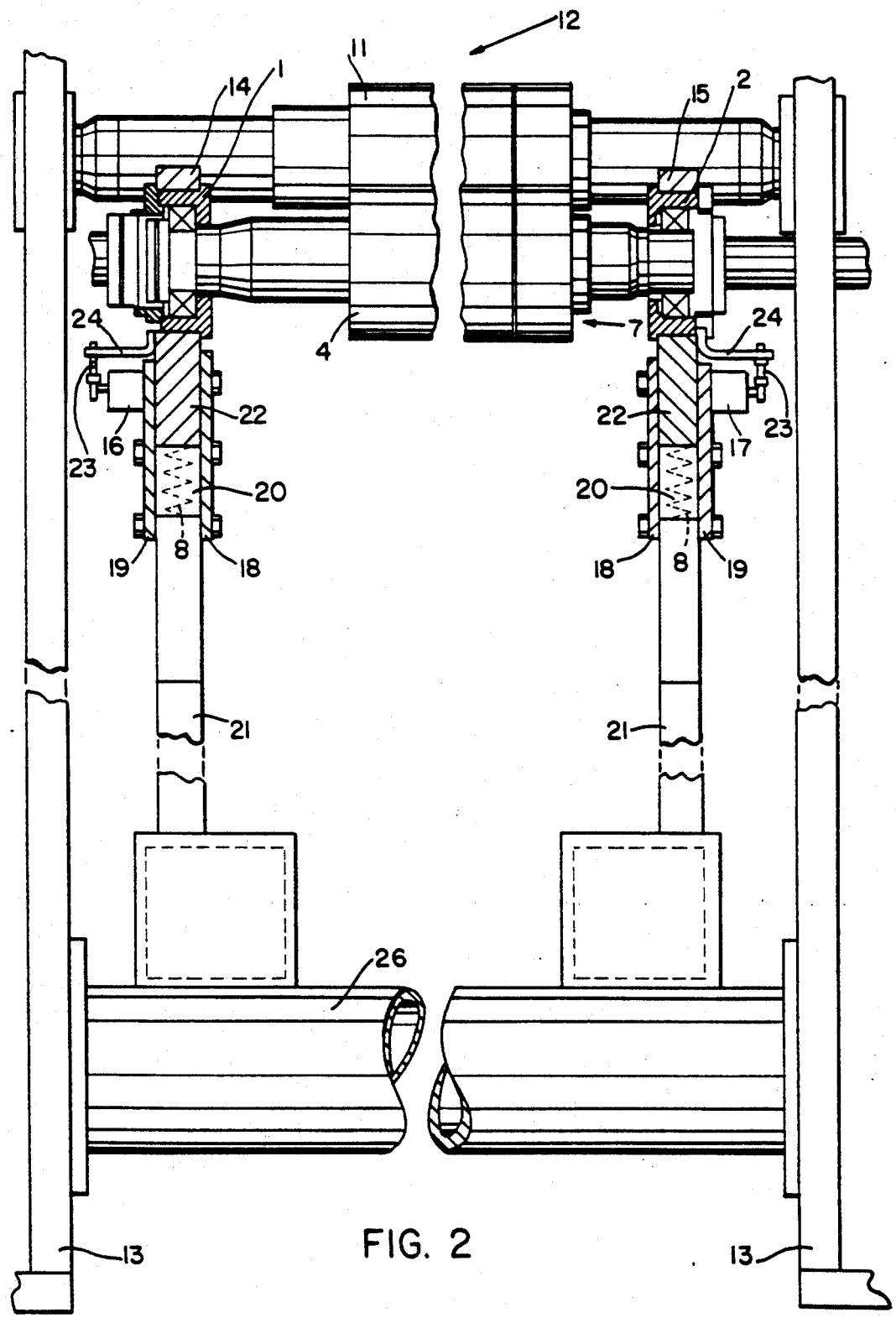
FIG. 2 shows a sectional view of an upper and a lower stretching roller along section line II—II in FIG. 1, of the present protection apparatus.

FIGS. 1 and 2 illustrate the construction operation of the present apparatus. An upper roller group 12 comprising rollers 9, 10, and 11 and a lower roller group 7 comprising rollers 3, 4, and 5 form a lengthwise stretching stage in a customary manner. The stretching stage has an entry side E and an outlet side A. The synthetic film web 25 to be stretched thus runs through the lengthwise stretching apparatus in a direction from E to A. The rollers 9, 10, and 11 of the upper roller group 12 are adjustable in their elevational position relative to the rollers 3, 4, and 5 of the lower roller group, by threaded spindles and motor drives not shown. The elevational adjustment is, for example, for the purpose of achieving a maximal looping of the film around the rollers. However, during the stretching process, the rollers 9, 10, and 11 are arrested in a fixed position.

The drive of the rollers is achieved in a manner known as such and will not be described in detail. If a film tearing occurs at the location "F" (FIG. 1), it results in wrapping of the film web 25 onto the roller 3. The wrapping leads to an enlargement of the roller diameter and finally leads to contact between the rollers 9 and 10 of the upper roller group 12. To the extent that now the film 25 leads to an enlargement of the diameter of the roller 3, the lower stretching roller 3 is moved or shifted, because of the increasing alternating pressure forces, against the spring force which is directed against the alternating pressure forces. During the shifting of the lower rollers the axes of the upper stretching rollers and of the lower stretching rollers remain in parallel to each other. However, a one-sided occurrence of the pressure forces can cause the left or right roller bearing to be shifted in the direction of the coil spring 8, whereby the axis of the shifted roller will slant. In order to keep this slanting of the roller axis within limits, an appropriate roller bearing is provided which is not shown in detail. This force acting against the alternating pressure forces is applied, for example, by a respective coil spring 8 embodied as a compression spring which is operatively connected with the right and left bearing housing 1, 2 of each roller 3, 4, 5 of the lower roller group 7 directly or indirectly through a respective bearing slider 22.

As shown in FIG. 2, the coil spring itself is enclosed in a space 20 which is formed in its horizontal extension by a first and second guide plate 18, 19 while its vertical boundaries are determined on the one hand by a bearing plate 21 connected to the bearing frame 13 by means of the traverse 26, and on the other hand by the bearing slider 22 which is rigidly connected with the bearing housing 1 or 2. In the area of the connection of the bearing housing 1, 2 with the bearing slider 22, a bail arm 24 carrying a switching pin 23 is attached. If any one of the lower stretching rollers 3, 4, 5 slides out of its upper end position, the switching pin operates the limit switch 16, 17 arranged on the stationary second guide plate in the area of the spring path of the spring 8 thereby triggering an emergency stop of the lengthwise stretching machine.

Although the invention has been described with reference to specific example embodiments, it will be appreciated that it is intended to cover all modifications and equivalents within the scope of the appended claims.

We claim:

1. An apparatus for protecting stretching rollers in a lengthwise stretching machine for synthetic film webs, comprising a machine frame, a first group of stretching rollers mounted in said machine frame, a second group of stretching rollers also mounted in said machine frame in such a position relative to said first group of rollers that a film web to be stretched must loop partially around all rollers of both groups, mounting means for movably mounting one of said roller groups for movement relative to the other roller group, stop means (14, 15) in said machine frame for limiting a movement of said one roller group in a first direction toward the other roller group, said mounting means for said one roller group comprising force generating means (8) for pressing said one roller group in said first direction against said stop means (14, 15) for maintaining an operative relationship between said roller groups, electrical limit switch means arranged for sensing a movement of said one roller group away from said stop means in a second direction opposite to said first direction to provide an electrical signal for stopping said machine when at least one roller of said one roller group moves away from said other roller group to an extent determined by said electrical limit switch means, and wherein each of said force generating means (8) is arranged in a space (20) formed between a first and a second guide plate (18, 19), said mounting means comprising a bearing plate (21) connected to said machine frame (13) and to said first and second guide plates, a bearing slider (22) slideably received in said space (20), said bearing slider (22) having one end operatively connected with said force generating means, said bearing slider being slideably held between said first and second guide plates (18, 19), said bearing slider having its other end rigidly connected with a bearing housing (1, 2) of said one group of rollers.

2. The apparatus of claim 1, wherein said force generating means comprise helical compression springs (8) for pressing said one roller group against said stop means.

3. The apparatus of claim 1, wherein said force generating means comprise hydraulic force application piston cylinders for pressing said one roller group against said stop means.

4. The apparatus of claim 1, wherein said electrical limit switch means comprise a bail arm (24) carrying a switching pin (23), said bail arm (24) being secured to one of said bearing sliders (22) for movement with said bearing slider, and a limit switch (16, 17) arranged on one of the respective guide plates for cooperating with said switching pins.

5. The apparatus of claim 4, wherein said bail arm (24) carrying said switching pin (23) is arranged in an area of a connection of said bearing slider (22) with said bearing housing (1, 2).

6. The apparatus of claim 4, wherein said limit switch (16, 17) is arranged on said second guide plate (19) in a movement range of said switching pin (23), said second guide plate being stationary.

7. The apparatus of claim 1, wherein both roller groups extend horizontally with all roller axes extending in parallel to one another, and wherein said one movably mounted roller group forms a lower roller group and said other roller group forms an upper roller group.

* * * * *